June 10, 1958     S. OLDBERG     2,838,244
VISCOUS DRIVE FOR FAN
Filed Jan. 10, 1955     2 Sheets-Sheet 1
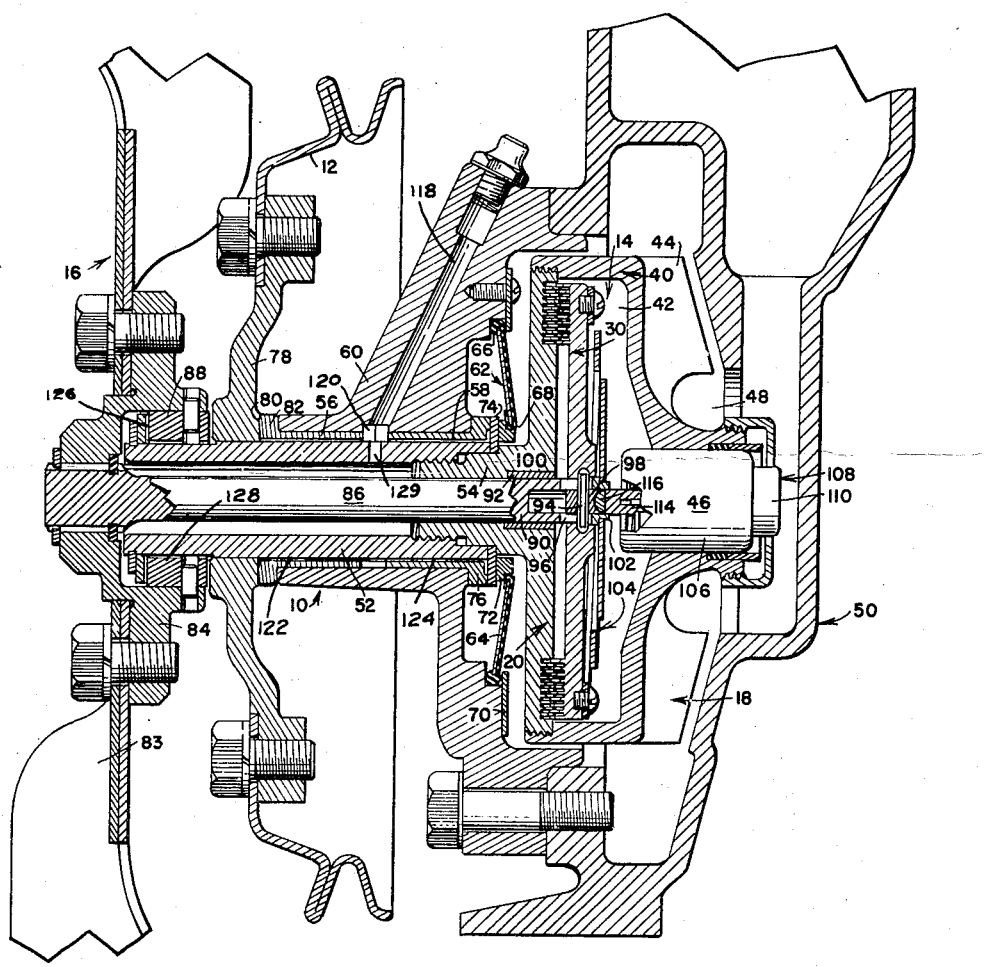
FIG_1
INVENTOR.
SIDNEY OLDBERG
BY
Attorneys

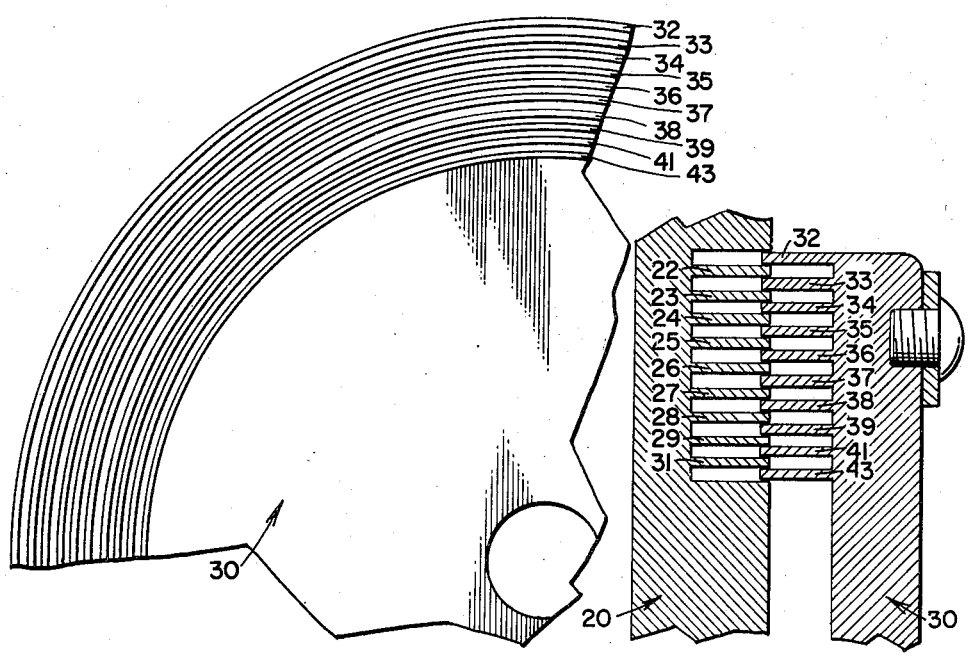
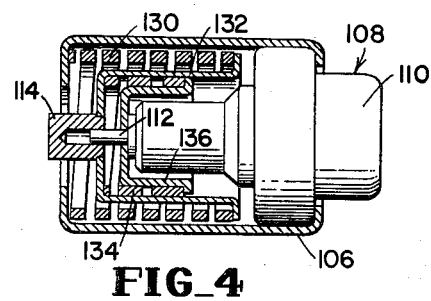
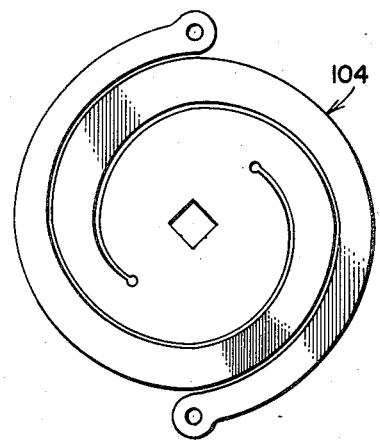
FIG_2
FIG_3
FIG_4
FIG_5
INVENTOR.
SIDNEY OLDBERG
Attorneys

United States Patent Office 2,838,244
Patented June 10, 1958

2,838,244

VISCOUS DRIVE FOR FAN

Sidney Oldberg, Birmingham, Mich., assignor to Eaton Manufacturing Company, Cleveland, Ohio, a corporation of Ohio Application January 10, 1955, Serial No. 480,634

7 Claims. (Cl. 236—35)

This invention relates to power transmitting mechanisms and more particularly to viscous couplings or drives of novel structural construction.

Broadly the invention comprehends the provision of a viscous coupling, the input and output members of which include interleaved cylindrical sleeve elements.

Although power transmitting couplings of the viscous type have been developed and applied to many varied uses they have all been of a structural make-up that does not permit of the simple and effective control thereof so as to limit the degree of power transmission between the input and output members thereof.

Among the objects of this invention is the provision of a viscous coupling, that:

a. Can be simply and effectively controlled to so limit the transmission capacity thereof;

b. Includes a plurality of cooperable interleaved annular members or cylindrical sleeves on the respective input and output members thereof;

c. Provides for the axial movement of the cylindrical sleeves of the respective members toward or away from one another to thus change the shear or cleavage force of transmission therebetween;

d. Is applicable for use as a clutch mechanism for vehicle fan drives permitting of the thermostatic control of power transmission between the input and output members in accordance with engine cooling requirements;

e. Is incorporated in the combined structure of a vehicle engine air fan and water pump; and, f. Provides for the effective transmission of power by shear or cleavage of the viscous fluid disposed between cooperable input and output elements thereof.

Other objects and advantages of the invention will appear from the following description taken in connection with the drawings forming a part of the specification, and in which:

Fig. 1 is a partially fragmentary cross-sectional view of a pump-fan structure in association with an engine block;

Fig. 2 is a fragmentary end view of an output member of a viscous coupling incorporated in Fig. 1;

Fig. 3 is a fragmentary cross-sectional view of the associated input and output members of the viscous coupling of Fig. 1;

Fig. 4 is a partly cross-sectional view of the thermostat unit for the pump-fan structure of Fig. 1; and, Fig. 5 is an end view of the spiral armed spring incorporated in Fig. 1.

This viscous coupling was devised primarily for use as a power transmitting mechanism in the operational control of a fan used in the circulation of air through an engine radiator for the purpose of cooling the liquid carried by the radiator and which liquid is in turn circulated through the engine. By so including cylindrical sleeve elements on the respective input and output members of the clutch adapted to be of such size and concentric arrangement as to provide interleaving of the elements of the respective members with one another and wherein a viscous fluid is contained in a chamber provided by said members for operational engagement with said elements, an effective power transmitting coupling is provided. Furthermore, by so moving said elements of the respective members axially relative to one another a variation in power transmission is readily and simply available. When so incorporated in a fan-pump structure of a liquid cooled engine, thermostatic means, for offsetting the axial relative movement of the members, is disposed in the liquid passage of the engine block, with the housing for the coupling also constituting the liquid pump for the engine.

Referring to the drawings for more specific details of the invention 10 represents generally a combination fan-pump structure for a liquid cooled engine.

Fan-pump structure 10 is adapted to be driven from the crankshaft, not shown, of an engine by way of a belt drive, not shown, arranged between a pulley mounted on the crankshaft and a pulley 12 forming a part of structure 10.

Structure 10 basically comprises a viscous coupling 14, a fan 16 and a water pump 18.

Coupling 14 includes an end plate member 20 having a plurality of radially spaced equal axial length concentric annular rings or cylindrical sleeves 22, 23, 24, 25, 26, 27, 28, 29 and 31 near the periphery thereof, a cooperating plate 30 having a plurailty of radially spaced equal axial length concentric substantially smooth surfaced annular rings or cylindrical sleeves 32, 33, 34, 35, 36, 37, 38, 39, 41 and 43 arranged in interleaved array with the sleeves 22, 23, 24, 25, 26, 27, 28, 29 and 31 of plate 20 and spaced radially therefrom across a predetermined axial length thereof when in operative position, and an enclosure plate or housing member 40 attached near its outer periphery to plate 20 so as to provide therebetween a chamber 42 within which plate 30 and a viscous fluid are contained. The viscous fluid is preferably of high viscosity such as silicone oil so that with a close spacing of the sleeves of the respective members 20 and 30 and the provision of thin fluid rings therebetween a high degree of shear or cleavage is had accounting for the effective transmission of power between members 20 and 30 by way of the sleeves thereof and the viscous fluid. Housing member 40 constitutes in part, by reason of the provision of radial blades 44 on the exterior thereof, the water pump 18. Member 40 is centrally apertured for the reception and rigid support therein of an actuating means such as a thermostatic mechanism 46 with one axial portion of the mechanism extending axially externally of member 40 and an opposite axial portion thereof extending into the chamber 42, the purpose of which will hereinafter appear.

Viscous coupling 14 and pump 18 are disposed in a liquid passage or chamber 48 of an engine block 50 and are supported for rotation therein by reason of a hollow shaft 52, secured at one axial end to hub 54 of plate 20, being journalled in sleeve bearings 56 and 58 supported internally of an end enclosure member 60 secured to block 50. End enclosure 60 constitutes and end wall of chamber 48 and has arranged axially internally thereof a liquid seal 62. Seal 62 is in the form of a spring plate ring 64 having bonded thereto rubber or like resilient sealing material providing an O-ring annulus 66 at its outer periphery and an annular sealing surface 68 at its inner periphery. Annulus 66 is held in sealing engagement upon the inner wall of enclosure 60 by a plate ring 70 mounted upon the inner wall of the enclosure, whereas sealing surface 68 engages a sealing ring 72 having end abutting sealing engagement upon a ring 74 secured axially between one end of shaft 52 and the hub 54 of plate 20 effective to provide a water tight seal for chamber 48. An annular ring portion 76 of sleeve bearing 58 is disposed in axial sealing engagement with ring 74 on the opposite side thereof from sealing ring 72. Both portion 76 of sleeve bearing 58 and ring 72 have relative rotative sealing engagement with ring 74.

Shaft 52 extends axially out of the enclosure 60 and has fixedly secured intermediate its length, externally of chamber 42 and enclosure 60, a hub member 78 of pulley 12 with an end surface 80 of the hub 78 in axial sealing engagement with an annular portion 82 of sleeve bearing 56.

Fan 16 includes a plurality of radially extended, circumferentially spaced blades 83 secured at their minor diameter to a hub member 84, which hub member 84 in turn is splined to a shaft 86. A sleeve bearing 88 is fixedly secured internally to a portion of hub 84 and is fitted in journalled relation telescopically about the free end of shaft 52 axially adjacent to the hub 78 of pulley 12. Shaft 86 extends concentrically within shaft 52 and is journalled near its opposite end 90 remote from hub 84 in a sleeve bearing 92 supported internally of the hub 54 of end plate 20. End 90 of shaft 86 supports for sliding movement thereon plate 30, by way of receiving a pin 94 in a cross slot 96 thereof. Pin 94 loosely connects the plate 30 of a cylindrical rod 98 fitted for axial movement in an end bore 100 in end 90 of shaft 86 so as to permit relative axial movement between plate 30 and shaft 86. The extremity of end 90 of shaft 86 is machined to provide a square section 102 for fitted connection with a complementary opening in a relatively thin multiple armed helical plate spring 104, with the outermost extremities of the arm of spring 104 fixedly secured to plate 30. Spring 104 in addition to acting as a resilient drive connection between shaft 86 and plate 30 is effective to hold plate 30 axially apart from plate 20 such that the sleeves of the respective plates 30 and 20 are in relatively disengaged and non-power transmitting position. Plate 30 is permitted to rotate through a minimum angle with respect to shaft 86 in order to accommodate the angular deflection of the resilient drive spring 104 under varying amounts of torque.

An actuating means such as the mechanism 46 includes a major cylindrical body 106 held in secured peripheral sealing relation in the central aperture of member 40. Body 106 supports therein at one end thereof a thermostat unit 108 having one extremity 110 thereof disposed in chamber 48 adapted to be thermostatically responsive to the liquid in chamber 48. Unit 108 contains a thermally expansible substance therein effective to move a pin 112 of unit 108 axially outwardly thereof upon temperature rise of the liquid in chamber 48. Pin 112 projects axially into a thimble or rod 114 arranged at its free end for movement therewith or relatively thereto and the free end of thimble 114 axially engages the flat side of a substantially semi-spherical button 116 arranged axially between thimble 114 and rod 98 with the semi-spherical surface of button 116 received in a complementary semi-spherical concavity at one end of rod 98. Attached at the opposite end of thimble 114 from button 116 is a cup member 132, with a low rate return spring 130 disposed between an inner end wall of body 106 and an outward radially extended flange of cup 132. A high rate overtravel spring 134 is disposed axially between the inner surface of the bottom of cup 132 and an outward radially extended flange of a cup 136 secured to pin 112 adjacent one end of thermostat unit 108. Any movement of pin 112 and the subsequent transmittal of movement of thimble 114 outwardly of body 106 by way of spring 134, serves by way of button 116, rod 98, and pin 94 to move plate 30 axially toward plate 20 against the resistance of spring 104.

As a means of affording proper lubrication for bearings 56 and 58 an oil passage 118 and interconnected space 120 and grooves 122 and 124 provide for the effective passage of lubricant to the surfaces of the bearing upon which shaft 52 is supported. Bearing 88 is also provided with lubricant passageways 126 and 128 for the lubricating of its engaging surface with shaft 52, said lubricant which is fed by way of passage 118 and space 120 being fed through opening 129 in shaft 52, in the space between shafts 52 and 86 and past hub 84 to bearing 88.

The end abutting engagement of portion 82 of bearing 56 and portion 76 of bearing 58 respectively with the hub 78 of pulley 12 and ring 74 serves to prevent leakage of the lubricant from between the bearings 56 and 58, and shaft 52.

In a normal operation of the fan-pump structure 10 wherein pulley 12 is driven from the engine crankshaft, not shown, hub 78, shaft 52, plate 20 and member 40 are directly driven at a like speed as the pulley due to the direct series connection therebetween. As a result of the sleeves 22, 23, 24, 25, 26, 27, 28, 29 and 31 forming an integral part of plate 20 and blades 44 forming an integral part of member 40 a shearing or cleavage action is had by sleeves 22, 23, 24, 25, 26, 27, 28, 29 and 31 upon the high viscous fluid contained in chamber 42 whereas blades 44 with member 40 forming liquid pump 18 serve to pump the liquid through the engine block 50 for the desirable circulation thereof. Assuming at this time that the liquid in chamber 48 is cool and is not effective to cause an expansion of the expansible substance contained in unit 108, spring 104 serves to hold sleeves 32, 33, 34, 35, 36, 37, 38, 39, 41 and 43 axially substantially apart from sleeves 22, 23, 24, 25, 26, 27, 28, 29 and 31 so that no appreciable power is transmitted between plates 20 and 30. It will be obvious that even though the viscosity of the viscous fluid might tend frictionally to drive plate 30 by reason of rotation of plate 20 and member 40, sufficient resistance to rotation thereof is offered by the journalled relation of shaft 86 and the weight of hub 84 and blades 83 so that blades 83 remain substantially idle. As the heat of the liquid in chamber 48 increases with continued operation of the engine the thermally expansible substance in unit 108 acts to move plate 30 in an axial direction toward plate 20 such that the sleeves 32, 33, 34, 35, 36, 37, 38, 39, 41 and 43 enter further into the radial spaces provided therefore between the sleeves 22, 23, 24, 25, 26, 27, 28, 29 and 31 of plate 20. The movement of plate 30 is effected by way of the series movement of the expansible substance in unit 108, pin 112, cup 136, high rate spring 134, cup 132, thimble 114, button 116, rod 98, and pin 94. With such movement of the sleeves axially into greater concentricity to one another the cleavage or shear action of sleeves 22, 23, 24, 25, 26, 27, 28, 29 and 31 acts to frictionally transmit, through the fluid in surface contact therewith, the motion thereof to the sleeves 32, 33, 34, 35, 36, 37, 38, 39, 41 and 43 in surface contact with the same annular rings of fluid disposed radially between the concentric surfaces of the interleaved sleeves. It will thus be obvious that as the concentric areas, of the sleeves exposed to like annular rings of fluid, is increased, a greater degree of power transmission is obtainable such as to operate the fan in varying ratio to the input speed of pulley 12 and plate 20 dependent upon the heat of the liquid in chamber 48 and the predetermined temperature of operation to which the thermostatic unit is gauged. Overtravel spring 134 acts to accommodate any overtravel of the thermostatic mechanism up to a temperature in excess of the normal predetermined operating temperature of the mechanism whereas low rate spring 130 is effective to return the pin 112, by way of cup 132, spring 134 and cup 136. Thimble 114 is limited as to maximum extent of its movement to actuate plate 30 by reason of cup 132 coming into engagement with an inner surface of an end flange of body 106. At this time the sleeves of the respective plates 20 and 30 are in full engagement.

Likewise as temperature increase in chamber 48 serves, by movement of the plates 20 and 30 toward one another, to effect a greater power transmission therebetween until a substantially ultimate 1 to 1 speed ratio is had, a temperature decrease in chamber 48 acts to permit of a contraction of unit 108 such that spring 104 serves to move the plates 20 and 30 apart in acting to move plate 30 to a substantially inoperative position for the transmission of power therethrough to fan 16.

While coupling 14 is here applied specifically to a pump-fan structure permitting of an operation of the pump under all conditions of engine operation while limiting the fan operation in accordance with predetermined temperature attainment of the engine cooling liquid it is readily conceivable of application as a power transmitting viscous coupling for many other varied mechanisms, with or without operational control or limitation of power transmission between the cooperable interleaving sleeves thereof. Accordingly, the invention is to be limited in the light thereof as expressed by the appended claims.

What I claim is:

1. A viscous coupling comprising a first member having a sleeve portion and a plate element having a plurality of substantially smooth surfaced, radially spaced, concentric rings mounted integrally on the side opposite said sleeve portion, an encompassing element attached to said plate element, a wall portion of said encompassing element being axially spaced from said plate element, a hub portion integral with said wall portion, a thermostatic element carried in said hub portion, a second member having a shaft portion, a plate portion attached to said shaft portion and disposed axially between said plate portion of said first member and said wall portion and being provided with a plurality of substantially smooth surfaced, radially spaced, concentric rings, said shaft portion of said second member, said plate element of said first member, said encompassing element and said thermostatic element forming a completely enclosed housing, said thermostatic element being operably connected to said plate portion of said second member to axially move said plate portion of said second member with respect to said plate portion of said first member whereby said concentric rings on said plate portions are adapted to be moved to an interleaved relationship, and a viscous fluid contained within said housing and disposed between said concentric sleeves of said members.

2. A viscous coupling comprising an input member having a plurality of substantially smooth surfaced, varied size, radially spaced, concentric sleeves mounted integrally on one side thereof, said sleeves being of uniform thickness throughout the axial length thereof, an output member having a plurality of substantially smooth surfaced, varied sized, radially spaced concentric sleeves mounted integrally on one side thereof opposite to the sleeves on said input member and arranged to be axially movable toward and away from said sleeves on said input member, a housing attached to said input member and cooperating with said input member to enclose said output member, pump blades mounted on said housing exteriorally thereof, and means to axially move said output member comprising a thermostatic mechanism having one actuating end axially engageable with said output member and an expansible unit supported on said housing.

3. An engine cooling apparatus comprising a cooling liquid chamber, a coupling having a first rotatable member including an end plate provided with a plurality of smooth surfaced, radially spaced concentric cylindrical sleeves extending axially from one end face thereof, a second end plate secured to the first end plate and forming a housing therewith which is disposed within a portion of said cooling liquid chamber, a second rotatable member including a part rotatably journalled in the first member, and a movable plate, supported for rotation with and axially movable to the part, having a plurality of smooth surfaced, radially spaced concentric sleeves extending axially from one face thereof opposite to the end face of the first end plate, resilient means interconnecting the part and the movable end plate biasing the sleeves of the end plate and movable plate from one another, a thermostat mechanism supported in the second end plate including an expansible element having a part extending axially outwardly of the end plate, and a member engageable with the movable plate effective to move the movable plate axially against the resistance of the resilient means upon an expansion of an expansive substance in the expansive element, said expansive substance being responsive to the temperature of the liquid in said cooling liquid chamber, and a viscous fluid in the housing and between the sleeves of the respective first end plate and movable plate.

4. A coupling according to claim 3 wherein the thermostatic mechanism includes a casing rigidly mounted relative to the expansible element, a second resilient means interposed between the movable member thereof and the casing, and said movable member including parts resiliently biased relative to one another, and wherein the movable member is operable to move the movable plate upon expansion of the expansible substance against the resistance of the resilient means incorporated in the thermostatic mechanism and between the part and movable end plate.

5. A coupling according to claim 3 wherein the resilient means is in the form of a multiple spiral armed plate spring having its central portion securely coupled to the shaft and the end extremities of the arms secured to the movable plate.

6. A coupling according to claim 4 wherein the second resilient means is a low rate spring, and wherein a high rate spring biases the parts of the movable member apart.

7. An engine cooling apparatus comprising a liquid pump, a cooling liquid chamber communicating with a portion of said pump, an air circulating fan, said pump and said fan being driven by a single power means, a viscous coupling for coupling said fan to said power means comprising an input member directly driven from said power source having a plurality of radially spaced, substantially smooth surfaced cylindrical sleeves integral therewith, said pump being integral with said input member, an output member connected directly with said fan having a plurality of radially spaced, substantially smooth surfaced cylindrical sleeves integral therewith arranged in interleaved concentric relation to the sleeves on the input member, a viscous fluid disposed between said sleeves of said members, and actuating means for the coupling, said actuating means and said coupling including said sleeves being disposed in said cooling liquid chamber.

References Cited in the file of this patent

UNITED STATES PATENTS

| | | |
|---|---|---|
| 969,848 | Davis | Sept. 13, 1910 |
| 1,238,447 | Severy | Aug. 28, 1917 |
| 1,482,167 | Varley | Jan. 29, 1924 |
| 2,423,140 | Earley | July 1, 1947 |
| 2,633,697 | Johnson | Apr. 7, 1953 |